W. W. HARVEY.
Cotton-Cultivator.

No. 208,088. Patented Sept. 17, 1878.

WITNESSES:
Francis McArdle,
C. Sedgwick

INVENTOR:
W. W. Harvey
BY Munn & Co
ATTORNEYS.

N. PETERS, PHOTO-LITHOGRAPHER, WASHINGTON, D. C.

UNITED STATES PATENT OFFICE.

WILLIAM W. HARVEY, OF CLARKSVILLE, TEXAS.

IMPROVEMENT IN COTTON-CULTIVATORS.

Specification forming part of Letters Patent No. 208,088, dated September 17, 1878; application filed July 20, 1878.

*To all whom it may concern:*

Be it known that I, WILLIAM WALLACE HARVEY, of Clarksville, in the county of Red River and State of Texas, have invented a new and useful Improvement in Cotton-Cultivators, of which the following is a specification:

My invention relates to implements for working and cultivating cotton-plants; and has for its object to furnish an apparatus or implement to take the place of the plow usually employed for throwing the soil from or toward the row of plants.

My invention consists in a frame carrying two forward rollers, provided with cutting-flanges for loosening and separating the soil, and two plows or scrapers for turning the soil to or from the row, according to their position.

Figure 1:
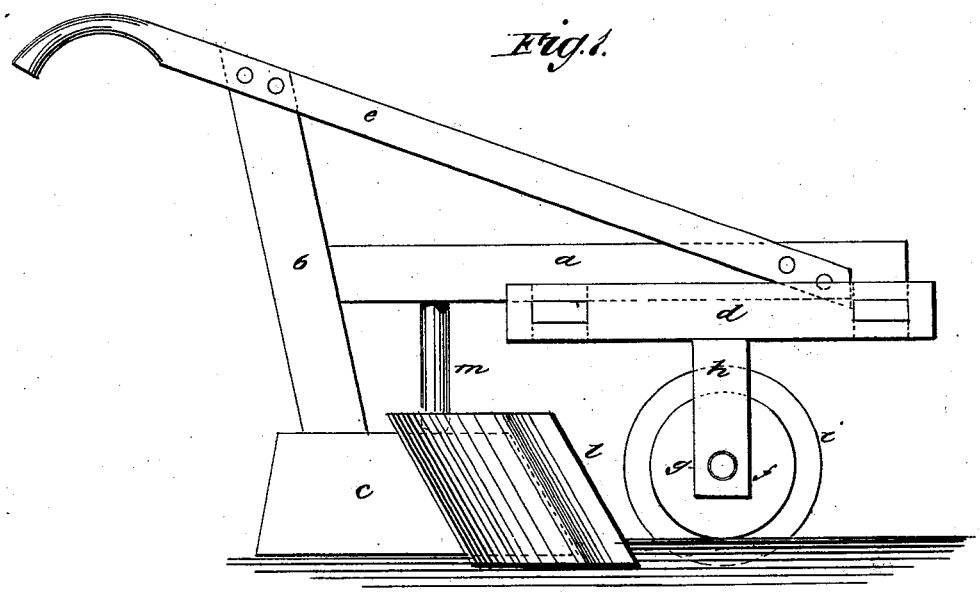
Figure 2:
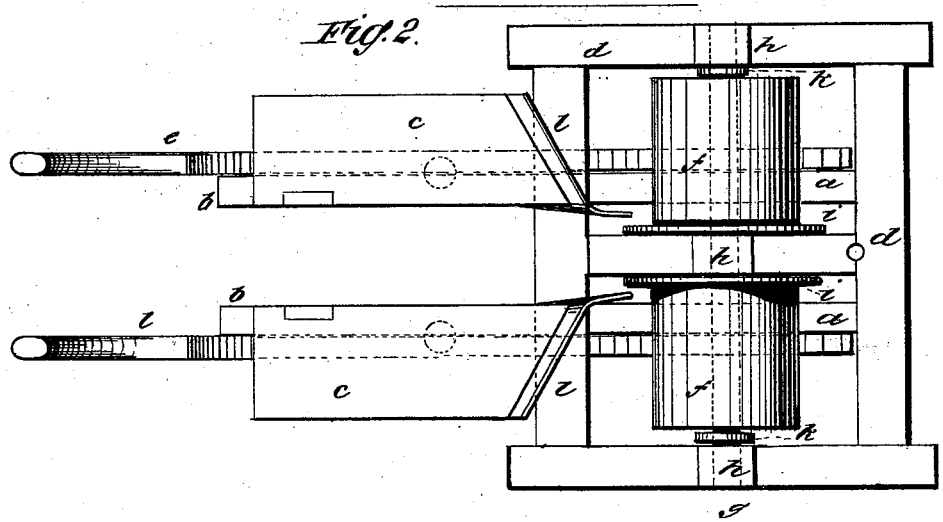

In the drawing, Figure 1 is a side elevation of my improved cultivator, and Fig. 2 is an inverted plan of the same.

Similar letters of reference indicate corresponding parts.

The frame of the cultivator consists of longitudinal bars $a$, with vertical posts $b$ at the rear, carrying the shoes $c$, which rest upon the ground.

$d$ is a frame, secured to the bars $a$ at their forward ends, and $e\ e$ are the handles, bolted to bars $a$ and the posts $b$.

$f\,f$ are rollers upon a cross-shaft, $g$, supported in hangers $h$ at the forward part of the frame $d$. These rollers $f$ run upon the ground; and $i\ i$ are circular cutters, secured upon the inner ends of the rollers $f$, and projecting to form cutting-flanges on the rollers.

In the drawing the rollers $f$ are separated by the central hanger $h$, which causes the cutters to run the proper distance apart when the cultivator is used for turning the soil away from the row. There is a washer, $k$, on the shaft $g$ between the rollers $f$ and each outside hanger, $h$, and when the cultivator is used for plowing up to the row the washers $k$ are placed next to the central hanger $h$, to cause the cutters to run farther apart.

$l\ l$ are scrapers or plows, secured upon the shoes $c$. These scrapers have a cutting-edge projecting forward in the rear of cutters $i$, and they are shaped generally like the mold-board of a plow, and act upon the soil in a similar manner.

The shoes $c$ and scrapers $l$ are changeable upon the posts $b$, so that they may be placed in the proper position for throwing the dirt to or from the row.

$m\ m$ are braces from the bars $a$ to the forward end of shoes $c$, and they serve to support the shoes.

The cultivator above described is to be drawn over the ground by horses connected to the frame $e$ at the forward part, and the cutters will run one at each side of the plants, cutting loose the crust of earth and weeds, and leaving a narrow row of plants. The scraper $l$ will turn the earth thus loosened away from the row, so that there will be very little work to be done afterward with a hoe, and both sides of the row are completed at once. The rollers will tend to keep the scrapers in a straight line and prevent destruction of the stand of plants by drifting of the cultivator.

The action will be the same when the scrapers are set for throwing soil up to the row, the cutters in that case being set farther apart, as described.

I do not limit myself to the shape of the scrapers and cutters shown and described, nor to the manner described of changing their position, as these details may be varied without departing from my invention.

Having thus described my invention, I claim as new and desire to secure by Letters Patent—

A cotton-cultivator in which the rollers $f$, cutters $i$, and scrapers $l$ are combined and relatively arranged as and for the purpose specified.

WILLIAM WALLACE HARVEY.

Witnesses:
JOHN A. BAGBY,
DAVID RAINEY.